July 9, 1957  C. B. DE VLIEG  2,798,910
ACTUATING MECHANISM

Filed Feb. 1, 1952  4 Sheets-Sheet 1

Inventor
Charles B. De Vlieg
McKenna & Morsbach
By
Attorneys July 9, 1957 C. B. DE VLIEG 2,798,910
ACTUATING MECHANISM
Filed Feb. 1, 1952 4 Sheets-Sheet 2

Inventor
Charles B. De Vlieg
By McKenna & Morsbach
Attorneys

United States Patent Office 2,798,910
Patented July 9, 1957

2,798,910

ACTUATING MECHANISM

Charles B. De Vlieg, Farmington, Mich.

Application February 1, 1952, Serial No. 271,801

21 Claims. (Cl. 200—56)

This invention relates to actuating mechanism, and particularly to an actuator for a switch controlling the operation of a mechanism for automatically positioning tool and work supports in machine tools, such as milling and boring machines.

One of the major problems involved in precision machine tool work is that of accurately positioning the work and tool supports relative to each other for performing successive, precisely spaced operations on a work piece, and of re-establishing a preselected position of either support after that support has been moved away from the preselected position to permit inspection of the work piece. In United States Patent 2,561,346 to Charles B. DeVlieg and Eugene E. Stegner, said Stegner assignor to said DeVlieg, there has been disclosed an improved motor powered apparatus for automatically positioning the tool or work support of a machine tool at a preselected position with a high degree of precision accuracy. Reference may be made to that application for a description of the problem involved in such automatic positioning and of the manner in which these problems were solved by the automatic positioning apparatus described therein. Associated with the automatic positioning apparatus, limit switches are provided which govern a control circuit determining the automatic operation of the positioning apparatus. One of the limit switches is movable with the work support and is actuated each time the work support is moved through a predetermined position, while the other switch is movable with the tool support and is actuated each time the tool support is moved through a predetermined position.

The present invention relates to improvements in the mechanism for actuating these limit switches in a manner insuring greater practicability.

An object of this invention is to provide an actuating mechanism, especially adapted to control the operation of a limit switch, which is extremely sensitive and precise in its response to changes in position of the device being positioned.

Another object of this invention is the provision of an actuating mechanism having a trip lever adapted to be interposed in the path of the device being positioned which is operative to trip in either direction of movement of the device being positioned.

A further object of this invention is to provide a switch actuator of novel construction which is adapted for operating limit switches and the like, for general application, and especially for controlling the automatic positioning mechanism for tool and work supports in machine tools.

Other and further objects and advantages of the invention will be apparent from the following description of a preferred embodiment thereof.

Figures 1, 2, 3, 4, 5:
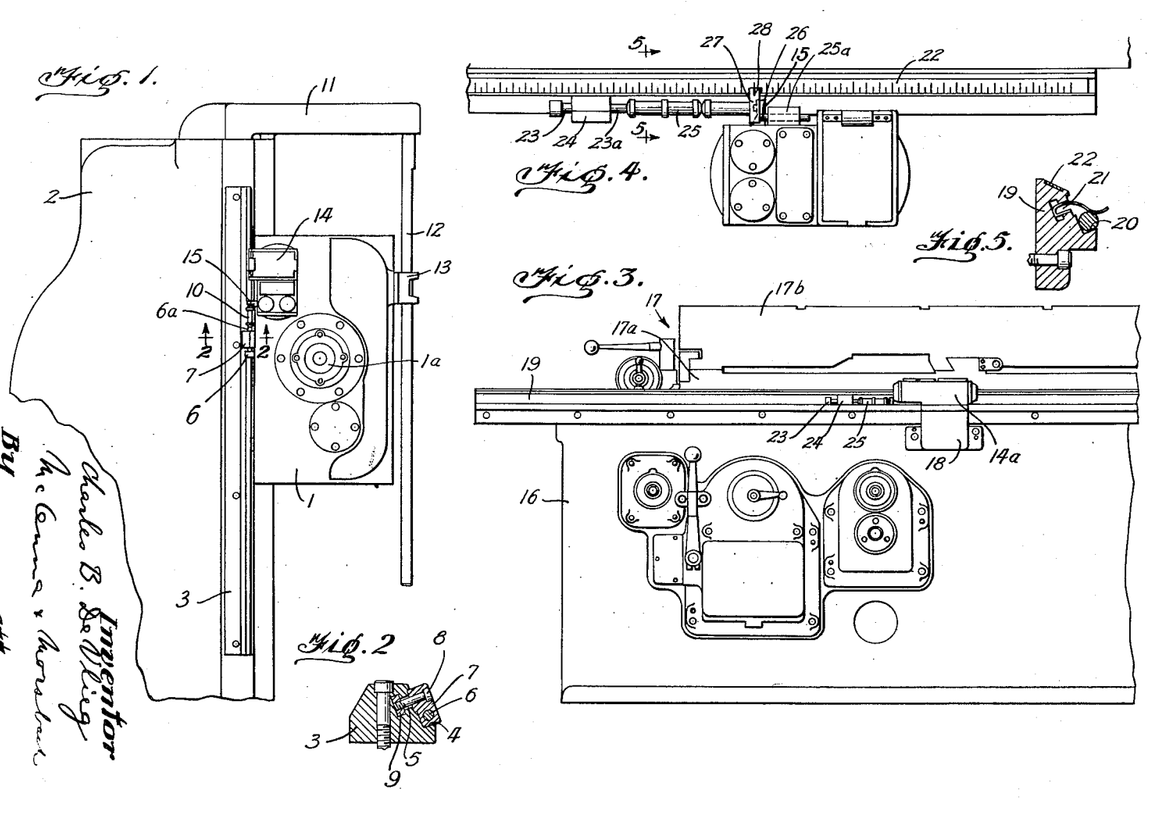
Figure 1 is a view of the switch actuating mechanism of the present invention associated with gauging means for controlling the automatic positioning of a vertically movable tool support or saddle of a machine tool.
Fig. 2 is a section along the line 2—2 in Figure 1.
Fig. 3 is a view of the switch actuating mechanism of the present invention associated with gauging means for controlling the automatic positioning of a horizontally movable work support or table of a machine tool.
Fig. 4 is a top view of the mechanism of Fig. 3.
Fig. 5 is a section along the line 5—5 in Fig. 4.

In Figure 1, the vertically movable tool support 1 is designed to carry a rotatable tool spindle 1a which receives a boring or milling tool or the like for performing boring or milling operations on the work piece. Vertical movement of the tool support is effected by a lead screw which is driven by motor controlled mechanism forming part of the automatic positioning apparatus. In this manner the vertical position of the tool holder is determined by the automatic positioning apparatus.

The tool holder is slidable along vertical ways integral with a fixed upright column 2. The upright column also carries a vertical rail 3 provided with a vertical trough 4. The rail 3 is also formed adjacent to the trough with a longitudinally extending recess 5 which is T-shaped in cross-section (Fig. 2). A micrometer adjusting screw 6 carries a holder 7 which is slidable along the vertical trough 4. A clamping screw 8 extends transversely through holder 7 into the T-slot 5 to engage the nut 9, which is adjustable along the inwardly positioned cross portion of the T-slot. With this construction, by loosening the clamping screw 8 the holder 7 may be moved to different positions along trough 4, at which positions the holder 7 may be securely positioned by tightening the clamping screw. One or more micrometer blocks 10 of the desired precise length are positioned along trough 4 directly above the upper end 6a of micrometer screw 6 extending beyond the upper end of holder 7. The micrometer screw 6 is threadedly received in holder 7 to be vertically adjustable relative thereto to adjust the vertical position of the lower face of the bottom micrometer block in the stack. In this manner the upper end of the topmost micrometer block in the stack can be adjusted to occupy a predetermined fixed position along the vertical rail 3.

At its upper end column 2 rigidly supports in cantilever fashion a horizontal bracket 11, which at its outer end carries a depending vertical scale shaft 12. The work holder 1 carries a rigid guide 13 which receives the vertical scale shaft and is slidable therealong as the work holder is displaced vertically relative to the fixed upstanding column 2.

The switch and micrometer dial gauge actuating mechanism is carried in a housing 14 secured to the work holder and movable in unison therewith. A pivoted lever 15, which controls the operation of the switch and micrometer gauge actuating mechanism, extends outwardly beyond the housing 14 in alignment with the stack of micrometer blocks. Thus, at a predetermined position of the work holder as it moves downward the lever 15 will be engaged by the upper face of the topmost micrometer block 10 in the stack to operate the switch and micrometer gauge actuating mechanism.

As shown in Figures 3–5, another unit containing the switch and micrometer gauge actuating mechanism of the present invention is associated with a horizontally movable work holder or table, to control the automatic positioning thereof, in the following manner:

A bed 16, which rigidly supports or is in rigid relation to the vertical column 2, carries along its top vertically aligned, horizontally spaced ways upon which the work support (generally indicated at 17) is slidably supported for movement in a horizontal plane. This work support is of two-part construction comprising a lower member 17a (commonly termed a "saddle") directly slidably supported upon the ways of the bed 16 and a top member 17b (commonly termed a "work table" or "platen") movable in a horizontal plane at right angles to the horizontal movement of the saddle 17a along the top of bed 16.

The housing 14a which contains the switch and gauge actuating mechanism associated with the control circuit of the automatic positioning apparatus for the work holder is carried on a bracket 18, which is rigidly connected to the bed 16. An elongated horizontal rail 19 is carried on the saddle 17 along the side thereof adjacent to the housing 14 for the switch and micrometer gauge actuating mechanism 14. The rail 19 is provided adjacent to its outer edge with a trough 20 (Fig. 5) which extends longitudinally of the rail and extends downward at an angle from the outer edge thereof. A longitudinally extending T-shaped recess 21 is formed above the trough 20 along the rail and spaced inwardly therefrom. A scale 22 is carried on an inclined upper face of the rail 19 above the T-slot 21.

A micrometer adjusting screw 23 carries a holder 24 which is slidable along the horizontal trough 20. Micrometer screw 23 and holder 24 are identical with the corresponding elements 6 and 7 in Figure 1, and the holder may be adjustably secured at any desired point along trough 20 by clamping means identical with that of Figure 1. One or more micrometer blocks 25 of the desired precise length are positioned along trough 4 directly in front of the forward end 23a of the micrometer screw 23, which extends beyond the forward end of holder 24 and is threadedly adjustable relative thereto. With this arrangement, the front end of the forward micrometer block in the series can be adjusted to occupy a predetermined position along the scale 22 carried by saddle 17a.

The pivoted lever arm 15 which controls the operation of the switch and micrometer gauge actuating mechanism 14a associated with the work holder is normally positioned to extend transversely just above trough 20, so as to be interposed in the path of movement of the forward micrometer block thereon.

A pointer bracket 25a is mounted on the switch actuator housing 14a adjacent the saddle and rotatably carries a pin 26 on which a pointer 27 is mounted to transversely overlie the scale 22. An index line 28 is scribed on pointer 27 and registers with indicia on scale 22 to indicate the position of work holder 17 relative to the bed 16, since scale 22 moves unitarily with the work holder while the pointer 27 occupies a fixed position along the bed 16.

In the operation of this mechanism, as the saddle 17a is moved forward (to the right in Figs. 3 and 4) the micrometer blocks 25 and the scale 22 move in unison therewith. At a predetermined position of the saddle in its forward movement the lever 15 of the switch and gauge actuator 14a will be engaged by the front end of the forward micrometer block to operate the actuating mechanism.

Turning now to the construction and operation of the switch and micrometer gauge actuating mechanism itself, the lever 15 extends at one side of the housing 14. Lever 15 is fixedly secured to a rotary shaft 30, which is journaled for rotation between bearing retainers 31, 32 attached to the spaced side walls of housing 14. Pairs 33 and 34 of inner and outer sleeves form raceways for ball bearings contained between the sleeves of each pair to provide anti-friction bearings for shaft 30 at either end thereof. A sleeve 35 having an enlarged head 36 intermediate its length is secured, by a lock screw 37 extending through a radial threaded aperture 38 in head 36 and into a registering threaded aperture 39 in shaft 30, to the shaft 30 to rotate angularly in unison therewith. At one axial face of the head 36 a driver 40 is secured which carries at its lower end a gear segment 41. At the other axial face of the head 36 a cam 42 is secured. With the above assembly, when lever 15 is moved angularly about its connection to shaft 30 it causes shaft 30 to rotate angularly. In such rotation of shaft 30 the driver 40 and the cam 42 are moved angularly about the axis of the shaft in unison therewith.

The actuating mechanism also includes a second shaft 43 mounted for rotation between spaced bearing retainers 44, 45 and pairs 46, 47 of ball bearing raceways at opposite sides of housing 14. A lever 48 for actuating the micrometer gauge is formed with an aperture 49 for receiving shaft 43 and is of split ring construction surrounding the hole 49 to form spaced arms 50, 51 at one side thereof. A hole 52 extends entirely through arm 50 and registers with a threaded aperture in arm 51 so that a screw may be inserted thereinto to clamp lever 48 rigidly onto shaft 43. A switch actuating lever 53 is formed with a transverse opening 54 for receiving shaft 43 and is also of split ring construction surrounding opening 54 to form spaced arms 55, 56 at one side thereof. A screw extends through a hole in arm 55 into a registering threaded aperture in arm 56 for clamping the switch lever rigidly onto shaft 43. A driven gear member 57, formed with a gear segment 58, is attached to the inner axial face of switch lever 53. A pin 59 secured to driven gear member 57 and switch lever 53 supports for rotation a roller 60 at the outer axial face of the switch lever. With the above assembly, when driven gear member 57 is displaced angularly about the longitudinal axis of shaft 43 the switch lever 53 and the gauge lever 48 also move angularly in unison therewith.

Figure 8:
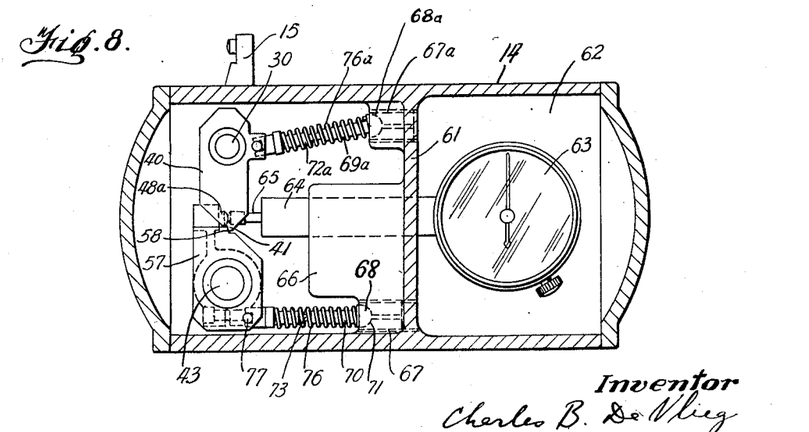
Fig. 8 is a section along the line 8—8 in Fig. 7 showing the normal position of the actuating mechanism for a micrometer gauge operated simultaneously with the switch which controls the circuit of the automatic positioning apparatus.

As best seen in Fig. 8, the housing 14 is divided by a transverse partition 61 to provide a separate chamber 62 for the micrometer gauge 63. A sleeve 64 extends through the partition 61 and slidably receives a plunger 65 whose position controls the dial position on the gauge 63.

Figure 14:
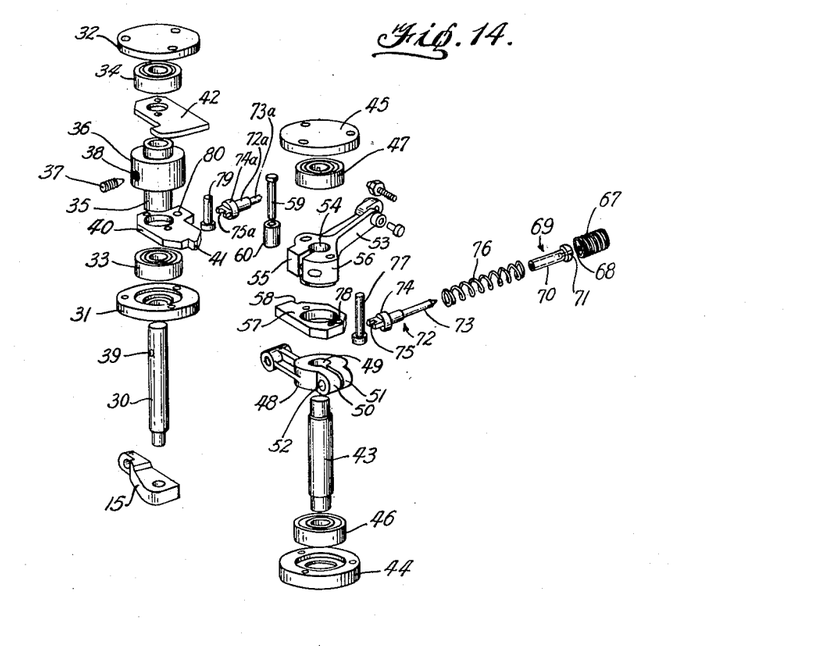
Fig. 14 is an exploded perspective view of the actuating mechanism for the micrometer gauge and for the switch which controls the circuit of the automatic positioning apparatus.

Formed integral with the housing partition 61 is a boss 66, which threadedly receives a socket member 67 (Fig. 8) formed with a semi-spherical seating recess 68 in its forward end. Coacting with this socket member is a spring seating member 69 (Fig. 14) in the form of a elongated hollow shaft 70 carrying an enlarged semi-spherical head 71 at one end to be received in the complemental seat 68 at the forward end of socket member 67. A spring plunger member in the form of an elongated shaft 72 has an extension 73 at one end of reduced cross-section adapted to extend freely into the axial recess in shaft 70. At its other end the shaft 72 carries an enlarged head 74 which is bifurcated at its free end to provide a slot 75. A coil spring 76 encircles the shafts 70 and 72 and is under compression between the enlarged heads 71 and 74, respectively, carried on said shafts. A headed pin 77 is secured to the driven gear member 57 at the aperture 78 therein to extend parallel to the shaft 43. The free end of head 74 engages pin 77, with the furcations on either side of slot 75 positioned on opposite sides of pin 77. In this manner the angular position of driven gear member 58 determines the position of the compression spring assembly 69—76 and the compression under which coil spring 76 is stressed.

At the opposite side of the casing, a socket member 67a extends transversely of the partition 61 and is formed with a semi-spherical seating recess 68a in its forward end. Socket member 67a is substantially similar in configuration to the previously described socket member 67. An arrangement of a spring seating member 69a, spring plunger member 72a and coil spring 76a, similar to the described arrangement of elements 69—76, is provided for permitting angular movement of the spring assembly 69a—76a about the socket member 67a. A headed pin 79 is secured to the driving gear member 40 at the aperture 80 therein and extends parallel to the shaft 43. The free end of head 74a engages pin 79 with the furcations on either side of slot 75a positioned on opposite sides of pin 79. By virtue of this arrangement the angular position of driving gear member 40 determines the position of the spring assembly 69a—76a about the socket 67a and the compression under which coil spring 76a is stressed.

In the normal position of the lever 15, the driving gear member 40 is positioned such that the spring 76a exerts a force off center from the axis of angular movement 30 of the driving gear member. The coil spring 76a urges the driving gear member clockwise in Fig. 8 about its pivotal axis. However, the driven gear member 57 is positioned to block such movement of the driving gear member 40 since the gear segment 58 on the driven gear member is directly in the path of movement of the gear segment 41 on the driving gear member. Coil spring 76 resiliently biases the driven gear member 57 to this position by exerting a force at pin 77 which is off center from the pivotal axis of the driven gear member 57. Spring 76 thus urges the driven gear member 57 clockwise about its pivotal axis to a position where it opposes the action of spring tending to move the driving gear member 40. Thus, in the normal position of lever 15 there is a balance of forces which prevents rotation of either of the shafts 30, 43. In this normal position of lever 15 the head 48a on the micrometer gauge actuating lever 48 is positioned to exert a positive inward force on the plunger 65 to maintain a zero reading on the micrometer gauge 63.

Figure 10:
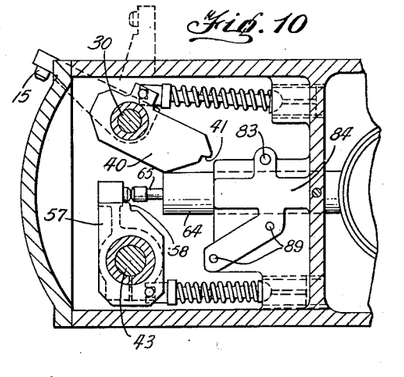
Fig. 10 is a view similar to Fig. 8 showing the actuating mechanism for the micrometer gauge after return overtravel of the support in the reverse direction.

When the lever 15 is at its normal position (Fig. 11) the switch lever 53, which is connected rigidly to shaft 43 and which moves in unison with driven gear member 57 occupies the position where its downward movement (clockwise in Fig. 11) is blocked by a transverse stop pin 81 which is engaged by a screw 82 mounted at the head end of the switch lever. Stop pin 81 is fixedly mounted in an aperture 83 formed in a wall 84 of the internal boss 66 extending longitudinally within the housing (Fig. 10). Screw 82 is threadedly mounted on the head end 85 of the switch lever so as to provide an adjustment of the position of the switch contacting head 86 of the switch lever against stop pin 81, which determines the normal position of the lever 15. A small precision snap-acting switch 87 (micro-switch) is fixedly mounted below stop pin 81 by means of screws 88 threadedly received in apertures 89 formed in the wall 84 on boss 66. A reciprocable plunger 90 extends upward through the top of the switch and is engaged and held depressed by the head 86 on the switch lever 53 when lever 15 is in its normal position. The switch plunger 90 moves only a few thousandths of an inch in opening and closing the switch 87, and the switch lever head 86 is positioned (by adjusting screw 82) so that it just maintains the switch plunger in its depressed position when the lever 15 is in its normal position. It is to be noted that the cam 42 mounted on shaft 30 engages the roller 60 which is rotatably carried on the switch lever 53. The lower cam surface on cam 42 includes a substantially straight upstanding portion 91, which bears against roller 60 in the normal position of lever 15, and a lower curved portion 92 which rides over roller 60 when lever 15 is pivoted clockwise in Fig. 11.

Upon movement of either the work support or the tool support forward into its desired preselected position, relative movement between lever 15 and the micrometer blocks will occur. Thus, when the tool support is moved downward toward its preselected position the lever 15 will move in unison therewith toward engagement with the upper face of the topmost micrometer block fixedly positioned with respect to the upright column 2. On the other hand, when the work support is moved forward toward its preselected position the micrometer blocks will move in unison therewith toward engagement of the front face of the forward micrometer block with the lever 15 whose axis is fixedly positioned relative to the bed 16 of the machine. When lever 15 is thus engaged by the micrometer block it is moved angularly a slight amount (clockwise in Fig. 8). Shaft 30 is also moved in the same direction, and carries with it the driving gear member 40. The driving gear member, which is in mesh with the driven gear member 57, rotates the latter about its pivotal axis to rotate shaft 43 a corresponding amount (counterclockwise in Fig. 8). This movement of shaft 43 lifts switch lever 53 to release the downward force on switch plunger 90 and permit the switch 87 to snap over to establish a different circuit condition for reversing the direction of movement of the support to compensate for the overtravel thereof in the forward direction. Also, by this movement of shaft 43 the lever 48 which actuates the micrometer gauge is retracted away from the gauge plunger 65 so that the gauge no longer reads zero.

Figures 6, 15:
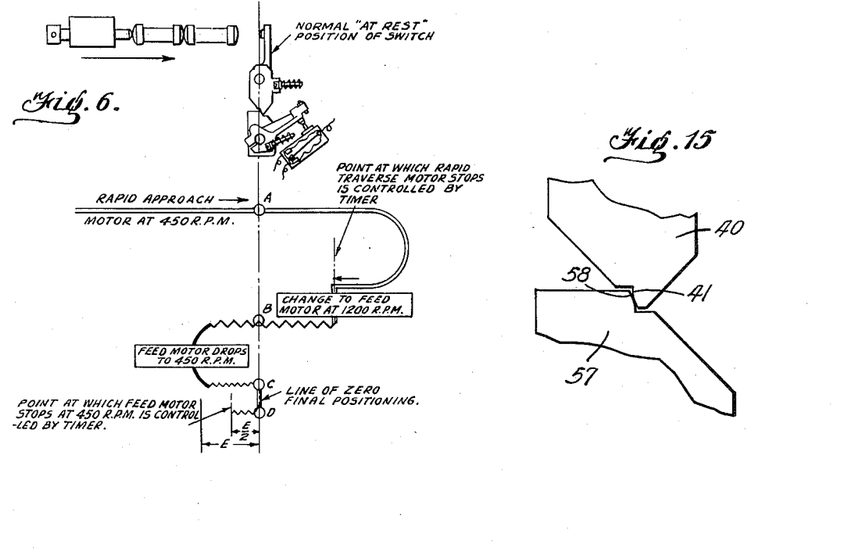
Fig. 6 is a schematic diagram illustrating the manner in which either of the supports is moved precisely to a preselected position under the control of the automatic positioning apparatus of which the present switch actuating mechanism is a part.
Fig. 15 is an enlarged view showing the meshing relationship of the driver and driven gear members.
Figure 7:
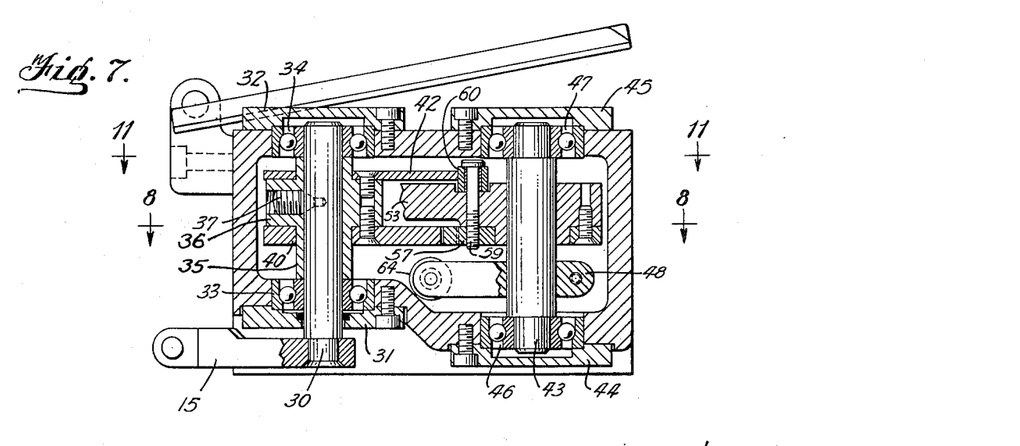
Fig. 7 is an end view in section of the present switch actuating mechanism.

As more fully described in the aforementioned U. S. Patent No. 2,561,346, in order to accurately position the support, its direction of movement is automatically reversed to compensate for the overtravel in the forward direction. Reverse movement of the support is at a lower speed but still results in overtravel in the reverse direction. Reverse movement of the support is automatically stopped by the positioning apparatus, and forward movement at a still lower speed is initiated to bring the support to rest precisely at its desired preselected position. This sequence of automatic operation is outlined in Fig. 6.

Since the automatic positioning of the support is controlled by the switch 87 the precision of such automatic positioning is in part dependent upon the sensitivity of the response of the switch 87 to the engagement or disengagement of the lever 15 by the micrometer block. The described mechanism provides an extremely sensitive interconnection between the lever 15 and the switch plunger 90 whereby the switch responds instantaneously to whether the plunger is being engaged by the micrometer block.

Figure 13:
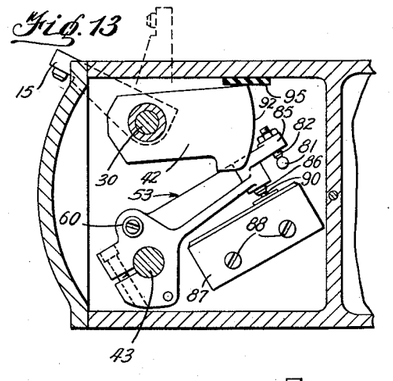
Fig. 13 is a view similar to Fig. 11 showing the position of the parts of the switch actuating mechanism after return overtravel of the support in the reverse direction.

For certain operations it is desired to automatically position the work holder successively at different positions, and for this purpose the micrometer blocks may be replaced by a master bar, such as shown in U. S. Patent No. 2,575,945 to Charles B. DeVlieg, having a plurality of upstanding pins which coact successively with the switch actuating mechanism to determine the respective positions of the work holder. In the event that one of these pins is located behind the lever 15 of the actuating mechanism, due to inattention or carelessness on the operator's part, the actuating mechanism cannot be damaged by such a pin striking the back side of the lever 15 since the latter is free to pivot in the reverse direction to assume the position shown in Figs. 10 and 13, out of the path of relative movement of these pins.

In the operation of the above-described actuating mechanism of the present invention, upon pivotal movement of lever 15 in the forward direction (clockwise in the drawings), the driving gear member 40 engages the driven gear member 57 to pivot the driven gear counterclockwise and to retract the dial gauge actuating lever 48 away from engagement with gauge plunger 65. Simultaneously the cam surface 91 on cam 42 engages roller 60 and the switch lever 53 is withdrawn from engagement with the switch plunger.

Figure 9:
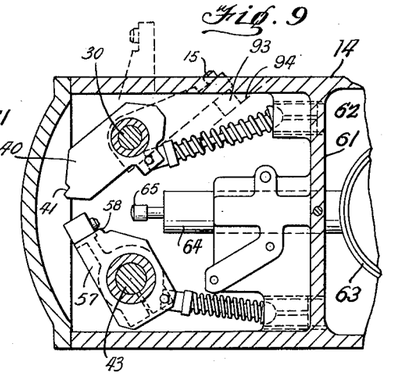
Fig. 9 is a view similar to Fig. 8 showing the actuating mechanism for the micrometer gauge after it has been tripped by overtravel of the support in the forward direction.

Upon continued movement of lever 15 in the same direction the driving gear 40 moves clear of the driven gear. While the driving gear is moving in this manner, the connection of spring 76a to the driving gear passes to the other side of the pivotal axis 30, so that the spring 76a now exerts a force tending to maintain the driving gear in the position of Fig. 9 (and thus to maintain lever 15 and shaft 30 in this position also). In this position, lever 15 rests against a resilient stop pad 93 (Fig. 9) attached to an inclined wall portion 94 of the housing 14 in alignment with lever 15. Lever 15 is thereby maintained in a position retracted from the path of relative movement of the micrometer blocks.

Figure 12:
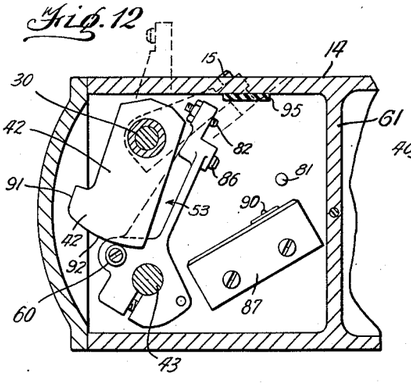
Fig. 12 is a view similar to Fig. 11 showing the switch actuating mechanism after it has been tripped by overtravel of the support in the forward direction.

This continued movement of lever 15 toward the described retracted position also results in further angular movement of cam 42 (clockwise in the drawings). The cam surface 91 passes over roller 60 and then the lower cam surface 92 engages roller 60 to ride over the same. Since the lower cam surface 92 is positioned farther from the axis of rotation 30 of the cam than is the cam surface 91, a force is thereby exerted on the roller 60 to pivot the switch lever 53 to which it is attached counterclockwise in the drawings. As long as the cam surface 92 is positioned (by the angular position of lever 15) to bear against roller 60, the switch lever 53 will be maintained in the upraised, retracted position of Fig. 12, overcoming the urging or bias of spring 76 which continues to apply a force against the gauge actuating lever 48 eccentric to the pivotal axis 43 thereof tending to pivot the lever 48 clockwise in the drawings.

When lever 15 is restored to its normal position, the driving gear 40 passes clear of the retracted driven gear. Also in this return movement of lever 15, the cam surface 92 passes over roller 60 and cam surface 91 then engages the roller. The retarding force against switch lever 53, opposing its return to its normal position, is thereby removed. Spring 76 provides the force for returning switch lever 53 to its normal position, limited by stop pin 81.

Upon reverse pivotal movement of lever 15 (counterclockwise in the drawings) the spring 76a exerts a force against the driving gear 40 eccentric to the pivotal axis 30 thereof to pivot driving gear 40, shaft 30 and cam 42 counterclockwise in the drawings. A resilient bumper pad 95 within the housing is abutted by the cam 42 to limit the reverse pivotal movement of lever 15, shaft 30 and driving gear 40. In this position (illustrated in Figs. 10 and 13), lever 15 is maintained retracted from engagement with the micrometer blocks. Shaft 43 and the levers carried thereon remain in the normal position because of the retardation by stop pin 81 of movement of this assembly in the direction in which it is urged by spring 76a.

Figure 11:
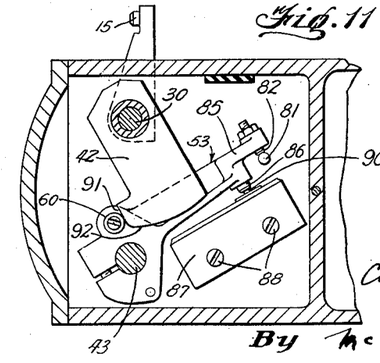
Fig. 11 is a section along the line 11—11 in Fig. 7 showing the normal position of the actuating mechanism for the switch which controls the circuit of the automatic positioning apparatus.

Lever 15 may be restored to its normal position manually, to restore the mechanism to the position shown in Figs. 8 and 11.

While in the foregoing description and the accompanying drawings there is disclosed a specific preferred embodiment of the present invention, it is to be understood that various modifications and changes which depart from the described embodiment of the invention may be adopted without departing from the spirit and scope of my invention.

I claim:

1. In an actuating mechanism, the combination of a first pivoted lever, a rotary shaft attached to said lever, a driving gear member mounted on said shaft movable therewith angularly in unison with the first lever, an angularly movable driven gear member operatively associated with said driving gear member, an actuating lever movable in unison with said driven gear member, first spring means acting against the driving gear member and biasing said driving gear member and said shaft in one direction, second spring means acting against the driven gear member and biasing the latter into engagement with the driving gear member to oppose movement of the driving gear member under the urging of said first spring means, the spring forces on the driving and driven gear members neutralizing each other maintaining the driving and driven gear members in equilibrium position engaging one another, and said gear member being operative upon angular movement of the first lever in one direction to displace the driven gear member against the urging of said second spring means and to move away from engagement with the driven gear member.

2. In an actuating mechanism for controlling the operation of an indicator, the combination of a housing, a first rotary shaft mounted in said housing, a first lever carried on said first shaft to move angularly therewith and extending beyond the housing, a driving gear member carried on said first shaft and movable angularly therewith, a second rotary shaft mounted in said housing, a driven gear member carried on said second rotary shaft, said driven gear member engaging said driving gear member to be displaced thereby upon angular movement thereof, a second pivoted lever operative to control the indicator movable in unison with said driven gear, a first coil spring acting against said driving gear member and biasing said first lever, said first shaft and said driving gear member in one direction, and a second coil spring acting against said driven gear member and biasing the latter into engagement with the driving gear member to oppose movement of the driving gear member under the urging of the first coil spring, the spring biases on the driving and driven gear members neutralizing one another to maintain the driving and driven gears in equilibrium position engaging one another.

3. In an actuating mechanism, the combination of a first pivoted lever, a first shaft connected to said first lever and rotatable upon pivotal movement of said first lever, a driving gear member and a cam mounted on said first shaft and movable therewith angularly in response to pivotal movement of the first lever, a second shaft, a driven gear member mounted on said second shaft and coacting with said driving gear member to be displaced angularly thereby in response to angular movement thereof, an actuating lever movable angularly in response to angular movement of said driven gear member, and said cam being operative upon pivotal movement of the first lever to maintain the actuating lever at the positions thereof to which it has been moved in response to the angular movement of the driven gear member.

4. In an actuating mechanism for controlling the operation of a switch and an indicator, the combination of a first pivoted lever, a first shaft connected to said first lever and rotatable in response to pivotal movement of said first lever, a driving gear member and a cam mounted on said first shaft movable therewith angularly in unison with said first lever, a second shaft, a driven gear member mounted on said second shaft and engaging said driving gear member to be displaced angularly thereby upon angular movement thereof, an actuating lever movable angularly in unison with said driven gear member, spring means biasing the actuating lever to a predetermined position, and said cam upon pivotal movement of the first lever coacting with said actuating lever to maintain the latter displaced away from said predetermined position thereof.

5. In an actuating mechanism for controlling the operation of a switch and an indicator, the combination of a first pivoted lever, a first shaft connected to said first lever and rotatable upon pivotal movement of said first lever, a driving gear member and a cam mounted on said first shaft and movable angularly therewith in response to pivotal movement of the first lever, a second shaft, a driven gear member mounted on said second shaft and coacting with said driving gear member to be displaced angularly thereby in response to angular movement thereof, an actuating lever movable angularly in response to angular movement of said driven gear member, spring means engaging said driven gear member and biasing said actuating lever to a predetermined position, said cam upon pivotal movement of the first lever coacting with said actuating lever to maintain the latter displaced away from said predetermined position thereof, and said spring means acting against said driven gear member to return said actuating lever to said predetermined position thereof upon return movement of the first lever.

6. In an actuating mechanism, the combination of a first pivoted lever, a first shaft connected to said lever and rotatable upon pivotal movement thereof, a driving gear member and a cam mounted on said shaft movable therewith angularly in unison with said first lever, spring means biasing the first lever, the driving gear member and the cam in a predetermined direction, a second shaft, a driven gear member mounted on said second shaft and coacting with said driving gear member to be displaced angularly thereby in response to angular movement thereof, said driven gear member normally being positioned to engage said driving gear member to limit the movement of the first lever in the direction in which the latter is biased, an actuating lever movable angularly in response to angular movement of said driven gear member, said driving gear member upon pivotal movement of the first lever in the direction in which the latter is biased displacing said driven gear member angularly and disengaging therefrom, said spring means being operative upon disengagement of the driving gear member from the driven gear member to maintain the first lever, the driving gear member and the cam in the respective positions to which the latter have moved, and said cam when so maintained coacting with said actuating lever to maintain the latter displaced from the position thereof in said normal position of the driven gear member.

7. In an actuating mechanism, the combination of a first pivoted lever, a first shaft connected to said lever and rotatable in response to pivotal movement thereof, a driving gear member and a cam mounted on said first shaft and movable therewith angularly in unison with said first lever, first spring means biasing said first lever, said driving gear member and said cam in a predetermined direction, a second shaft, a driven gear member mounted on said second shaft and coacting with said driving gear member to be displaced angularly thereby in response to angular movement thereof, an actuating lever movable angularly in unison with said driven gear member, second spring means biasing said actuating lever to a predetermined position and biasing said driven gear member into engagement with said driving gear member to limit the movement of the first lever in the direction in which the latter is biased, said driving gear member upon pivotal movement of the first lever in the direction in which the same is biased displacing said driven gear member angularly and disengaging therefrom, said first spring means being operative upon disengagement of the driving gear member from the driven gear member to maintain the first lever, said driving gear member and said cam in the respective positions to which the latter have moved, said cam upon such pivotal movement of the first lever coacting with said actuating lever to maintain the latter displaced from said predetermined position thereof, and said second spring means acting against said actuating lever to return the same to said predetermined position thereof upon return movement of the first lever.

8. In an actuating mechanism, the combination of a rotary first shaft, a driving gear member carried on said first shaft to move angularly therewith, a first spring biasing said driving gear and said first shaft in one direction, a second shaft, an angularly movable driven gear member mounted on said second shaft, an actuating lever movable angularly with said driven gear member, and a second spring biasing said driven gear member in a direction opposite to said one direction in which said driving gear member is biased into engagement with said driving gear member to limit movement of said driving gear member in said one direction, the spring forces on the driving and driven gear members neutralizing one another to normally maintain the driving and driven gear members in an equilibrium position engaging one another.

9. In an actuator, the combination of a rotary first shaft, a first lever connected to said shaft, a rotary driving gear member carried by said shaft for rotation therewith, a first spring engaging said driving gear member off-center from its axis of rotation on said shaft and biasing said first lever, said first shaft and said driving gear in one direction, a second shaft, a rotary driven gear member mounted on said second shaft, an actuating lever movable in unison with said driven gear member, and a second spring engaging said driven gear member off-center from its axis of rotation on said second shaft and biasing said driven gear member into engagement with said driving gear member to limit the movement of said driving gear member in said one direction, the respective forces exerted by said springs on the driving and driven gear members neutralizing one another to normally maintain the driving and driven gear members in an equilibrium position engaging one another.

10. In an actuating mechanism, the combination of a rotary first shaft, a driving gear member and a cam mounted on said shaft and movable angularly therewith, spring means biasing the driving gear member and the cam in a predetermined direction, a second shaft, a driven gear member mounted on said second shaft and coacting with said driving gear member to be displaced angularly thereby in response to angular movement thereof, said driven gear member normally engaging said driving gear member and limiting the movement of said driving gear member and said cam in the direction in which they are biased, an actuating lever movable angularly with said driven gear member, said driving gear member upon pivotal movement in the direction in which it is biased displacing said driven gear member angularly and disengaging therefrom, said spring means being operative upon disengagement of the driving gear member from the driven gear member to maintain the driving gear member and the cam in the respective positions to which they have moved, and said cam when so positioned coacting with said actuating lever to maintain the latter displaced from the position thereof in said normal position of the driven gear member.

11. In an actuating mechanism, the combination of a rotary first shaft, a driving gear member and a cam mounted on said first shaft and movable angularly therewith, first spring means biasing said driving gear member and said cam in a predetermined direction, a second shaft, a driven gear member mounted on said second shaft and coacting with said driving gear member to be displaced angularly thereby in response to angular movement thereof, an actuating lever movable with said driven gear member, second spring means biasing said actuating lever to a predetermined position and biasing said driven gear member into engagement with said driving gear member to limit the movement of the driving gear member and the cam in the direction in which they are biased, said driving gear member upon movement in the direction in which it is biased displacing said driven gear member angularly and disengaging therefrom, said first spring means upon disengagement of the driving gear member from the driven gear member maintaining the driving gear member and the cam in the respective positions to which they have moved, said cam upon said movement coacting with said actuating lever to maintain the latter displaced from said predetermined position thereof, and said second spring means acting against said actuating lever to return the same to said predetermined position thereof upon return movement of the driving gear member and the cam.

12. Switch and micrometer dial gauge actuating mechanism for controlling the operation of mechanism for automatically positioning tool and work supports in machine tools comprising, in combination, a housing on one of said supports, a first and a second shaft mounted in the housing in parallel spaced relation for rotative movement, an actuating lever fixed to the first shaft and having its outer end extending outside the housing, a micrometer block or the like mounted on the other support in a position to contact the outer end of said lever in an actuating movement, a micrometer gauge associated with the housing and having a dial operating plunger on an axis located intermediate said shafts and perpendicular to a plane intersecting the axes of said shafts, a lever fixed to the second shaft arranged to actuate said dial plunger, a micro-switch associated with the housing having an element operable for opening and closing the switch, a lever fixed to the second shaft arranged to actuate said switch element, a driver member fixed to move with the first shaft having at its outer end a gear segment, a driven member fixed to move with the second shaft having at its outer end a gear segment arranged for coaction with the gear segment of the driver member, compression spring means acting against the driving gear member and also against the driven gear member to hold their gear segments in contact one with the other when the actuating lever is in a normal position and with the dial plunger held in a zero reading position, said switch lever being arranged to depress said micro-switch element when the actuating lever is in said normal position, and a cam member fixed to the first shaft arranged for coaction with the switch actuating lever to hold said lever in a position withdrawn from the micro-switch element when the actuating lever has been operated by the micrometer block in an actuating movement.

13. Actuating mechanism as set forth in claim 12, in which the actuating lever is moved in one direction on its shaft mounting from said normal position in an actuating operation and in which the actuating lever is free to move in the opposite direction away from said normal position without operating the micro-switch.

14. Switch and micrometer dial gauge actuating mechanism for controlling the operation of mechanism for automatically positioning tool and work supports in machine tools comprising, in combination, a housing on one of said supports, an actuating lever mounted on the housing and having its outer end extending outside the housing, a micrometer block or the like mounted on the other support in a position to contact the outer end of said lever in an actuating movement, a micrometer gauge associated with the housing and having a dial operating plunger, means in the housing arranged to be operated by said actuating lever and arranged to actuate said dial plunger, a micro-switch associated with the housing having an element operable by said means for opening and closing the switch, the actuating lever being arranged for operating in one direction from a normal position to actuate the dial plunger and the micro-switch and being free to move from said normal position in the opposite direction.

15. Switch and micrometer dial gauge actuating mechanism for controlling the operation of mechanism for automatically positioning tool and work supports in machine tools or the like supports comprising, in combination, a housing assembly on one of the supports including a micrometer gauge and a micro-switch, an actuating lever, a micrometer block or the like on the other support in a position to operate the actuating lever, and means operative between the actuating lever and the micrometer gauge to indicate a zero reading position on the gauge when the actuating lever is in the normal position and also operative between the actuating lever and the micro-switch to hold the switch in a given position when the actuating lever is in said normal position.

16. Switch and micrometer dial gauge actuating mechanism for controlling the operation of mechanism for automatically positioning tool and work supports in machine tools comprising, in combination, a housing on one of said supports, a first and a second shaft mounted in the housing in parallel spaced relation for rotative movement, an actuating lever fixed to the first shaft and having its outer end extending outside the housing, a micrometer block or the like mounted on the other support in a position to contact the outer end of said lever in an actuating movement, a micrometer gauge associated with the housing and having a dial operating plunger, a lever fixed to the second shaft arranged to actuate said dial plunger, a micro-switch associated with the housing having an element operable for opening and closing the switch, a lever fixed to the second shaft arranged to actuate said switch element, a driver member fixed to move with the first shaft having at its outer end a gear segment, a driven member fixed to move with the second shaft having at its outer end a gear segment arranged for coaction with the gear segment of the driver member, compression spring means acting against the driving gear member and also against the driven gear member to hold their gear segments in contact one with the other when the actuating lever is in a normal position and with the dial plunger held in a zero reading position, said switch lever being arranged to depress said micro-switch element when the actuating lever is in said normal position, and a cam member fixed to the first shaft arranged for coaction with the switch actuating lever to hold said lever in a position withdrawn from the micro-switch element when the actuating lever has been operated by the micrometer block in an actuating movement.

17. Switch and micrometer dial gauge actuating mechanism for controlling the operation of mechanism for automatically positioning tool and work supports in machine tools comprising, in combination, a housing on one of said supports, a first and a second shaft mounted in the housing in parallel spaced relation for rotative movement, an actuating lever fixed to the first shaft and having its outer end extending outside the housing, a micrometer block or the like mounted on the other support in a position to contact the outer end of said lever in an actuating movement, a micrometer gauge associated with the housing and having a dial operating plunger, a lever fixed to the second shaft arranged to actuate said dial plunger, a micro-switch associated with the housing having an element operable for opening and closing the switch, a lever fixed to the second shaft arranged to actuate said switch element, a driver member fixed to move with the first shaft having at its outer end a gear segment, a driven member fixed to move with the second shaft having at its outer end a gear segment arranged for coaction with the gear segment of the driver member, and spring means biasing the driving gear member and also the driven gear member to hold their gear segments in contact one with the other when the actuating lever is in a normal position and with the dial plunger held in a zero reading position.

18. Switch and micrometer dial gauge actuating mechanism for controlling the operation of mechanism for automatically positioning tool and work supports in machine tools comprising, in combination, a housing on one of said supports, a first and a second shaft mounted in the housing in parallel spaced relation for rotative movement, an actuating lever fixed to the first shaft and having its outer end extending outside the housing, a micrometer block or the like mounted on the other support in a position to contact the outer end of said lever in an actuating movement, a micrometer gauge associated with the housing and having a dial operating plunger, a lever fixed to the second shaft arranged to actuate said dial plunger, a micro-switch associated with the housing having an element operable for opening and closing the switch, a lever fixed to the second shaft arranged to actuate said switch element, a driver member fixed to move with the first shaft, a driven member fixed to move with the second shaft arranged for one way driving coaction with the driver member, compression spring means acting against the driving gear member and also against the driven gear member to hold them in driving relation when the actuating lever is in a normal position and with the dial plunger held in a zero reading position, said switch lever being arranged to depress said micro-switch element when the actuating lever is in said normal position, and a cam member fixed to the first shaft arranged for coaction with the switch actuating lever to hold said lever in a position withdrawn from the micro-switch element when the actuating lever has been operated by the micrometer block in an actuating movement.

19. In an actuating mechanism, the combination of a first pivoted lever, spring means normally biasing said first lever in a predetermined direction, a pivoted actuating lever operatively associated with said first lever to move about its pivotal axis in response to pivotal movement of the first lever in the direction in which the latter is biased, said actuating lever normally being disposed at a predetermined position, said spring means being operative upon pivotal movement of said first lever in a direction opposite to that in which the same is normally biased to maintain the first lever in the position to which it has moved, and said actuating lever upon such pivotal movement of the first lever remaining in said predetermined position thereof.

20. In an actuating mechanism, the combination of a first pivoted lever, first spring means normally biasing said first lever in a predetermined direction, a pivoted actuating lever operatively associated with said first lever to move about its pivotal axis in response to pivotal movement of the first lever in the direction in which the latter is biased, second spring means biasing said actuating lever to a predetermined position, said first spring means being operative upon pivotal movement of said first lever in a direction opposite to the direction in which the same is normally biased to maintain the first lever in the position to which it has moved, and said second spring means upon such pivotal movement of the first lever maintaining the actuating lever in said predetermined position thereof.

21. In an actuating mechanism, the combination of a first pivoted lever, a driving gear member movable angularly in unison with said first lever, first spring means biasing the driving gear member in one direction, a driven gear member coacting with said driving gear member to be displaced thereby upon angular movement thereof in the direction in which the same is actuated, an actuating lever movable angularly in unison with said driven gear member, second spring means biasing the actuating lever to a predetermined position and biasing the driven gear member into engagement with the driving gear member to oppose movement of the driving gear under the urging of said first spring means, said first spring means being operative upon pivotal movement of said first lever in a direction opposite to the direction in which the same is normally biased to maintain the first lever in the position to which it has moved, said second spring means upon such pivotal movement of the first lever maintaining the actuating lever in said predetermined position thereof.

References Cited in the file of this patent

UNITED STATES PATENTS

| | | |
|---|---|---|
| 776,521 | Levin | Dec. 6, 1904 |
| 1,268,910 | Zell | June 11, 1918 |
| 1,742,746 | Zubaty | Jan. 7, 1930 |
| 1,942,825 | Meunier | Jan. 9, 1934 |
| 2,181,829 | Jeffrey | Nov. 28, 1939 |
| 2,468,974 | Hammer | May 3, 1949 |
| 2,478,341 | Tarney | Aug. 9, 1949 |
| 2,507,637 | Krize | May 16, 1950 |
| 2,542,531 | Jeffrey | Feb. 20, 1951 |
| 2,554,171 | Brunot | May 22, 1951 |
| 2,562,075 | Washam | July 24, 1951 |